UNITED STATES PATENT OFFICE.

LAZAR EDELEANU, OF PLOYESCHI, ROUMANIA.

PROCESS FOR PURIFYING CRUDE PETROLEUM AND ITS DISTILLATES.

No. 911,553.   Specification of Letters Patent.   Patented Feb. 2, 1909.

Application filed June 1, 1908. Serial No. 436,042.

*To all whom it may concern:*

Be it known that I, LAZAR EDELEANU, a subject of the King of Roumania, and residing at Ployeschi, in the Kingdom of Roumania, have invented new and useful Improvements in Processes for Purifying Crude Petroleum, its Products, and its Distillates, of which the following is a specification.

The treatment of crude petroleum for obtaining most of its products has hitherto usually been carried out by fractional distillation, whereupon the distillates were treated with sulfuric acid and alkali. This method in many cases, for example, in the treatment of petroleum, which contains large proportions of hydrocarbons poor in hydrogen, or in the treatment of crude petroleum having an asphalt base or containing sulfur compounds, is unsatisfactory, but hitherto no process which would work economically and more successfully has been provided to replace it. Even in cases where it is possible to obtain good products by using large quantities of sulfuric acid or using a high temperature during refining, the process is very costly, owing to loss from the formation of oxidized products or from other chemical action. The amount of sulfuric acid required is very large, the recovery of which is not possible without great losses of sulfuric acid on account of the formation of sulfonic compounds.

The objects of the present process are (1) to avoid the loss of the treated material either by oxidation or other chemical action; (2) to use a solvent and to recover the whole of it; (3) to obtain a better product, especially in the illuminating oils, and (4) to lower the cost of the treatment.

Other objects will appear from the hereinafter description.

My present invention consists in treating the crude petroleum, its distillates and its products with liquefied sulfur dioxid or sulfur dioxid in the state of liquefaction. I have discovered that the coloring and disagreeably smelling compounds, and the constituents rich in carbon and poor in hydrogen of the crude petroleum, which injure the quality of the petroleum products, are soluble in liquefied sulfurous dioxid, whereas the hydrocarbons which constitute the refined product are difficultly soluble or altogether insoluble in liquefied sulfur dioxid, supposedly consisting principally of paraffins and naphthenes. This discovery enables me to separate by a physical process the prejudicial constituents of crude petroleum or its distillates merely by using the liquefied sulfurous dioxid as a solvent.

Figure 1:
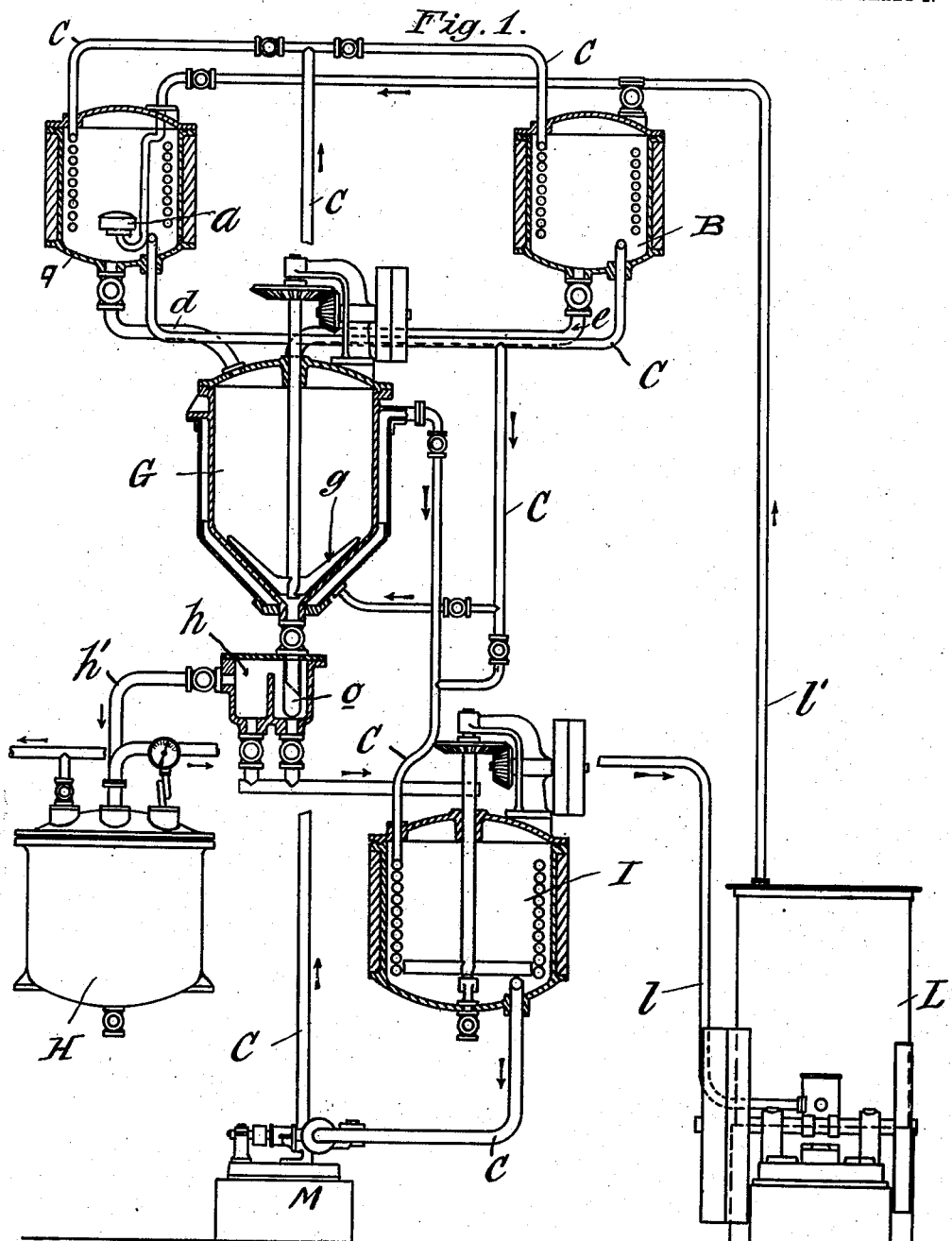
Figure 2:
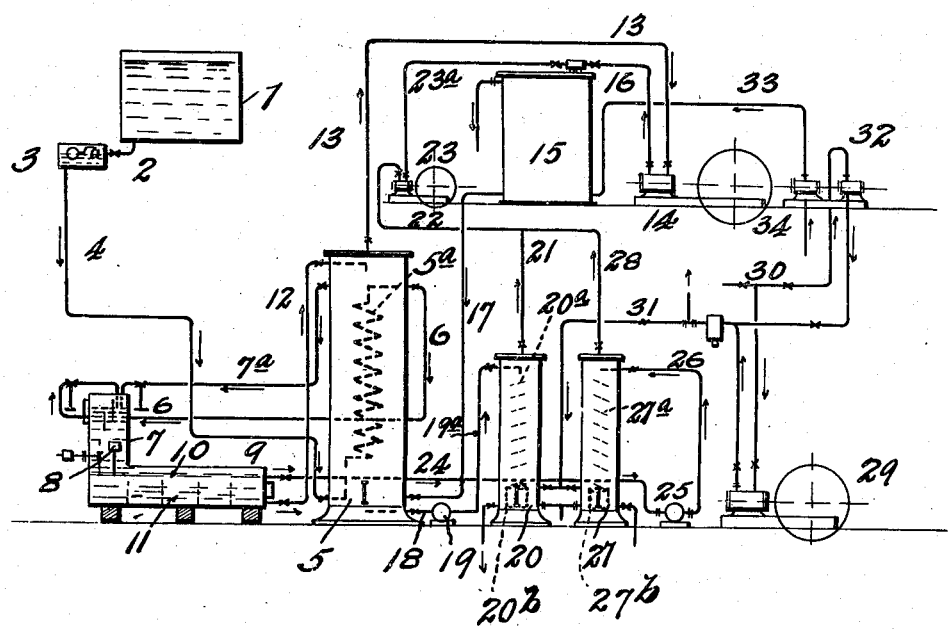

In the drawing, Figure 1 shows in vertical section, apparatus adapted for use in carrying out the process intermittently. Fig. 2 shows diagrammatically apparatus adapted for carrying out the process continuously.

In Fig. 1, A is a measuring tank for the crude petroleum, supplied with a cooling coil. B is another measuring tank for liquefied sulfurous dioxid, and is provided with a cooling coil, both cooling coils being supplied with a cooling agent through the pipe C. G is a mixing chamber, provided with an agitator $g$ revolved by gears, a separable part of the contents of which may be drawn off through the chest $h$ provided with an observation glass $o$ through the pipe $h'$ into the tank H, and another part may be drawn off into the tank I. L is a compressor and liquefying tank, into which is admitted gaseous sulfurous dioxid through the inlet pipe $l$, and from which liquefied sulfurous dioxid may be supplied through the pipe $l'$ to the measuring tank B, having been liquefied under moderate pressure and cooling in the usual way. Through the same pipe $l'$ gaseous sulfur dioxid may be introduced into the measuring tank A, through the inlet pipe and rose $a$ where by pressure, or by cooling, or by a combination of pressure and cooling, the gaseous dioxid may be liquefied, and this introduction of gaseous sulfur dioxid is in lieu of the liquid dioxid in the measuring tank B. M is a pump working the circulating system in all the cooling coils, through the pipes C. C. C. This apparatus is merely by way of illustration, and I will now describe the intermittent process of carrying out my invention by means of this apparatus.

I charge tank A with crude petroleum, from which preferably the gases have been distilled off and from which more or less of the volatiles may or may not have been distilled off, or I may charge it with any of the distillates containing the coloring or ill-smelling compounds or the constituents rich in carbon and low in hydrogen, or those which contain other undesirable constituents which are objectionable in the best commercial products, or with any of the products of crude petroleum. I charge the tank B with liquefied sulfurous dioxid, having brought both the oil to be treated and the liquefied sulfur-dioxid preferably to about the temperature of ten degrees C. below zero. I may introduce gaseous sulfur dioxid through the pipe $l'$, directly into the measuring tank A. The oil contained in the tank A is then discharged through the pipe $d$ into the mixing chamber G, where if necessary, a further cooling is effected by use of its cooling jacket. Then the liquid sulfur dioxid is led into the mixing chamber G through the inlet pipe $e$, where it is thoroughly mixed by the agitator $g$. After the mixing has been effected by the agitator, which may be in perhaps five minutes or may require hours, according to the mobility of the liquid and the quantity treated, the solution of the injurious or undesirable constituents may be complete. Since the specific gravity of the liquefied sulfur dioxid is about twice that of the refined product, and since the liquefied sulfur dioxid contains in solution the undesirable constituents of the crude oil or other materials treated, I obtained a complete separation of the refined product from the undesirable products in solution by allowing the contents of the mixing chamber G to settle. At this state of the process, I obtain in G two distinct layers of the contents, the upper layer being the refined product, and the lower the heavier liquefied sulfur dioxid with all the remaining constituents of the oil, in solution therein. Thereupon, I draw off the lower layer into the tank I and the refined product into the tank H. The recovery of the entire quantity of sulfur dioxid employed may be effected by gasifying it, by relieving the pressure, whereupon it evaporates, and the gasification may be assisted by the use of an exhaust pump, or I may employ some heat. The last traces of the sulfur dioxid in both the refined product and in the residuum may be separated by washing with water or with aqueous alkaline solutions, or after the separation, I may recover the sulfur dioxid by taking it up in water, then boiling it off from the water, and then returning the gaseous sulfur dioxid to the compressing pump, from which after compression anew it may participate in repeated operations of the same kind.

I obtain by my present invention on the one hand, products purer than those obtained by the ordinary refining processes by sulfuric acid; and on the other hand, the residuum which, mixed with acid, was hitherto a waste product, or partially charred, is by my process obtained in commercial form.

For certain purposes I may treat the petroleum, its products, or its distillates, according to my new process before or after the usual treatment with sulfuric acid. The extracted substances may be utilized in any required way, for example, for obtaining therefrom aromatic compounds or other materials of technical value, or they may be used as solvents. I may add the whole quantity of liquefied sulfur dioxid at once to the substance to be treated, or in several portions, dividing the treatment into several successive operations, with successively small portions of clean liquefied sulfur dioxid.

The treatment with a liquefied sulfur dioxid according to my invention may be carried out either in closed or open vessels. If it be carried out in open vessels the liquid mixture should be kept at a sufficiently low temperature to avoid evaporation of the sulfur dioxid, say at ten degrees C. below zero. If that temperature be not sufficiently low at the beginning of the operation, partial evaporation of the liquefied sulfur dioxid takes place and causes the necessary lowering of the temperature. Or the process may be carried out by gradually adding liquefied sulfur dioxid to the cooled petroleum or petroleum products or distillates and mixing by agitation, or the contact of the liquids may be effected by conducting them in opposite streams against each other or by forcing the one liquid through the other. Or the process may be carried out by introducing gaseous dioxid under pressure into the petroleum or petroleum products or distillates and cooling the mixture, but the pressure and the temperature must be regulated so as to cause the formation of liquid sulfur dioxid; for example, at atmospheric pressure if the temperature be 10 degrees C. below zero, the solution of the injurious substances in the liquefied sulfur dioxid is separated and collects at the bottom, while the purified products collect above. But I may work at higher temperatures, at the ordinary room temperatures, by raising the pressure and working in a closed tank, and thereby keep the sulfurous dioxid in liquefied state, but it is preferable to cool the entire mixture down to about ten degrees C. below zero, more or less, in order to get a good separation. The proportion of the liquefied sulfur dioxid depends on the amount of the prejudicial matter present in the crude petroleum products or its distillates, and on the properties of the petroleum to be treated; for example, four parts by weight of a distillate from Bustenari petroleum of a specific gravity of 0.820 are treated with five parts by weight of liquefied sulfur dioxid at 10 degrees C. below zero, in three stages mixing the distillate first with three parts by weight of the liquefied sulfur dioxid, then separating, then mixing the sparated purified distillate with a further one part by weight of liquefied sulfur dioxid, then separating again; then mixing this second separated and purified distillate with a further one part by weight of liquefied sulfur dioxid, and finally separating a third time. In this way there is obtained a good burning oil of a specific gravity of from 0.802 to 0.803. The specific gravity of the substances extracted by solution by means of the liquefied sulfur dioxid is about 0.860. The specific gravity of the mixture of liquefied sulfur dioxid and the dissolved contents is between 1.15 and 1.30.

According to the specific gravity of the petroleum or petroleum products or distillates, their composition, the amount and composition of the injurious substances and the way in which the sulfur dioxid is added, the amount of sulfur dioxid required for carrying out my process may vary, but a sufficient quantity must be present to dissolve all the constituents that I desire to separate, and in most cases this quantity of the dioxid is preferably by weight equal to or greater than the amount of the material to be treated, and yet I get beneficial results by treatment with a less quantity of dioxid; for example, if I am satisfied to obtain a poorer grade of oil, I may use this less quantity; if I use too small a quantity I may get no separation at all.

I have described by way of illustration an intermittent process, but obviously I may employ a continuous process by discharging the contents of the mixing chamber G into a long horizontal tank with separating partitions in the bottom, into which the mixture is introduced in a continuous small stream and the separated contents drawn off continuously in small streams, the purified product from the top, and the liquid sulfur dioxid from the bottom containing in solution other constituents to be separated out, then separating the principal bulk of the sulfur dioxid by removing the pressure, thereby producing evaporation, whereupon I get the separated products with only traces of sulfur dioxid and the refined product also with traces of sulfur dioxid. These may be separately treated with heat for the purpose of expelling the last traces of sulfur dioxid, or it may be done by washing or otherwise.

I have shown in Fig. 2 of the drawing, an apparatus adapted for carrying out the process continuously. In the use of this apparatus the crude petroleum is placed in the storage tank 1. From here it flows through the pipe 2 into the float controlled supply tank 3 and passes thence through the pipe 4 into the coil $5^a$ in the vessel 5. The vessel 5 contains liquid sulfur dioxid which is permitted to evaporate, and by evaporating cools the petroleum which flows through pipes immersed in it. The cooled petroleum passes through the pipe 6 into the vessel 7. In this vessel 7, the petroleum is mixed with the liquefied sulfur-dioxid which flows from evaporator 5 through the pipe $7^a$. After the mixture has been stirred by the agitator 8, it flows into vessel 9 where a separation of the layers is effected. The upper layer 10 is the petroleum from which the constituents soluble in liquid sulfur-dioxid have been removed. The lower layer 11 is the solution of the constituents of the petroleum to be removed, in solution in liquid sulfur-dioxid. After the separation of the layers has taken place, the lower layer passes through pipe 12 into evaporator 5, where the sulfur-dioxid is removed by evaporation and passes through pipe 13 into the compressor 14 and is again condensed into liquid sulfur-dioxid. This condensation takes place in the condenser 15 into which the sulfur-dioxid passes through pipe 16 from the compressor. The liquefied sulfur-dioxid passes out of the condenser 15 through pipe 17 again into the evaporator 5 and then returns to the mixer 7 through pipe $7^a$. The hydrocarbons extracted from the principal mass of the sulfur-dioxid flow out of the evaporator 5 through pipe 18 under the action of pump 19 and pass through pipe $19^a$ into the tall tank 20 provided with baffle plates $20^a$ and are here freed by further evaporation from any sulfur-dioxid which may still be present induced by the pump 23. The sulfur-dioxid thus evaporated passes through pipe 21 into pipe 22 leading to pump 23, and is conveyed to the the condenser through pipe $23^a$. The upper layer of liquid, 10 is drawn out of the vessel 9 through pipe 24 by the action of pump 25 and passes through pipe 26 into a tall tank 27 provided with baffle plates $27^a$ where it is freed from any remaining sulfur-dioxid which may be present induced by the pump 23. This sulfur-dioxid passes through pipe 28 into pipe 22 and thus reaches the compressor 23. The power necessary to work the apparatus is provided by the steam engine 29, which receives steam through pipe 30. The exhaust steam passes through pipe 31 to heat the tall tanks 20 and 27, by means of the radiators $20^b$ and $27^b$ shown in dotted lines within said tanks. The steam pump 32 likewise receives steam through pipe 30 and conveys to the condenser 15, the water obtained through pipe 34.

The present process is suitable for all kinds of crude petroleum, its products, and its distillates, especially is it used for refining Texas, Ohio, California, Roumania, Galicia and similar oils. It is possible to obtain good oils burning without smoke, with good illuminating power and of good merchantable quality.

The chief advantages of the present invention are the employment of a cheap solvent, the sulfur-dioxid, which may be produced by burning sulfur, or by roasting pyrites, or by heating sludge sulfuric acid obtained by the ordinary process of refining petroleum; no loss in the treated material either by oxidation or by other chemical reaction; the entire quantity of the solvent can be recovered and used again, and the absorption of heat by the evaporation of the liquid dioxid can be utilized to cool down to the required temperature the products to be treated.

Thus it will be seen that my invention is comprehensive and extends to every application of solubility to separate the constituents of crude oil or of any of its products or distillates by sulfur-dioxid, which dissolves one or more of those constituents and refuses to dissolve others, whatever the apparatus used, whether the process is intermittent or continuous, whatever the succession or order of the various steps, whether sulfur-dioxid is introduced in a state of liquefaction, or is liquefied during the process, whatever the time of treatment or the proportion of the sulfur-dioxid, and whether in closed or open vessels, provided it be in sufficient quantity to dissolve some or all of the ingredients of the oil treated, and not in such small quantity as to precipitate.

Having now described my invention, what I claim as new, and desire to secure by Letters Patent is:

1. The process of treating petroleum, petroleum products and the distillates, which consists in treating the same with liquefied sulfur-dioxid, in quantity sufficient to dissolve constituents to be separated, dissolving constituents of the same therein, and separating the two liquids.

2. The process of purifying petroleum, petroleum products and the distillates, which consists in treating the same with liquefied sulfur-dioxid, in quantity sufficient to dissolve constituents to be separated, separating the two liquids, and separating the sulfur-dioxid both from the purified petroleum and from the dissolved constituents.

3. The process of treating petroleum, its products and distillates, which consists in introducing gaseous sulfur-dioxid into the material to be treated in sufficient quantity to dissolve the constituents to be removed, reducing the sulfur-dioxid to a liquid state whereby the said constituents will dissolve therein, and separating the resulting liquids.

4. The process of treating petroleum, petroleum products, and the distillates, which consists in introducing gaseous sulfur-dioxid into the substances to be treated, in sufficient quantities to dissolve the constituents to be removed under pressure sufficient at the working temperature to liquefy the gas, and separating the two liquids by lowering the temperature of the mixture.

5. The process of treating petroleum, petroleum products and the distillates, which consists in introducing gaseous sulfur-dioxid in such quantity as to dissolve those hydrocarbons which are rich in carbon and low in hydrogen, cooling the mixture to a temperature below zero centigrade, whereby the sulfur-dioxid is liquefied wherein the hydrocarbons rich in carbon and poor in hydrogen are dissolved, and causing the mixture to separate in two liquids, the lighter containing the purified constituents, and the heavier containing the liquefied sulfur-dioxid and dissolved hydrocarbons, and drawing off the two layers separately.

6. The process of treating petroleum, petroleum products and the distillates, for the separation of the heavy hydrocarbons, rich in carbon, which consists in treating them with liquefied sulfur-dioxid in such quantity that the said hydrocarbons are dissolved in the liquefied sulfur-dioxid, then causing separation of the treated material, and drawing off the liquids separately.

7. The process of treating petroleum, petroleum products and its distillates, which consists in treating the same with sulfur-dioxid in sufficient quantity to dissolve the constituents to be removed, dissolving constituents of the same therein, applying pressure and separating the two liquids.

8. The process of treating petroleum, petroleum products and the distillates, which consists in treating the same with sulfur-dioxid in sufficient quantity to dissolve the constituents to be removed, dissolving constituents of the same therein, gradually cooling the liquids and separating and drawing off the liquids by stages.

9. The process of treating petroleum, petroleum products, and the distillates, which consists in treating the same with sulfur dioxid in sufficient quantity to dissolve the constituents to be removed, dissolving constituents of the same therein, conducting a stage of the process under cold and pressure, and separating the liquids.

In witness whereof I have hereunto set my hand in presence of two witnesses.

LAZAR EDELEANU.

Witnesses:
HENRY HASPER,
WOLDEMAR HAUPT.